United States Patent

Hart

[11] 4,086,393
[45] Apr. 25, 1978

[54] GAS PHASE FREE LIQUID CHLORINE ELECTROCHEMICAL SYSTEMS

[75] Inventor: Thomas G. Hart, Royal Oak, Mich.

[73] Assignee: Energy Development Associates, Madison Heights, Mich.

[21] Appl. No.: 744,712

[22] Filed: Nov. 24, 1976

[51] Int. Cl.² .............................................. H01M 2/38
[52] U.S. Cl. .................................... 429/51; 429/199; 204/128
[58] Field of Search .................. 429/50–52, 429/199, 201, 229–331, 13–15, 53, 72; 204/128, 263, 266, 232

[56] References Cited

U.S. PATENT DOCUMENTS

| 456,843 | 7/1891 | Pieper | 429/50 |
| 1,377,722 | 5/1921 | Marconi | 429/14 |
| 2,584,117 | 2/1952 | Elrod, Jr. | 429/51 |
| 2,690,467 | 9/1954 | Kendall | 429/53 |
| 3,809,578 | 5/1974 | Symons | 429/51 X |
| 3,912,999 | 10/1975 | England | 429/199 X |
| 3,985,581 | 10/1976 | Stachurski et al. | 429/51 |
| 3,993,502 | 11/1976 | Bjorkman, Jr. | 429/51 |

Primary Examiner—Charles E. LeFevour
Attorney, Agent, or Firm—Ostrolenk, Faber, Gerb & Soffen

[57] ABSTRACT

A gas phase free, liquid chlorine electrochemical system and apparatus therefore are described in which the housing containing the electrodes is filled with sufficient electrolyte so that the pressure therein is sufficient to liquify the chlorine as it is generated.

9 Claims, 4 Drawing Figures

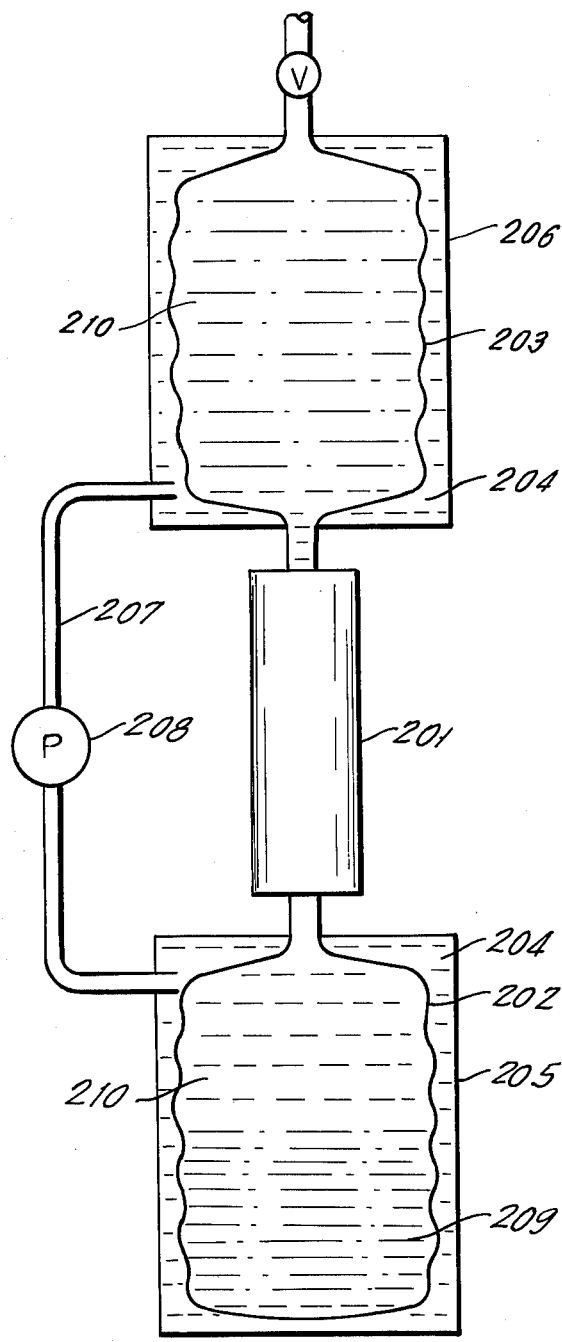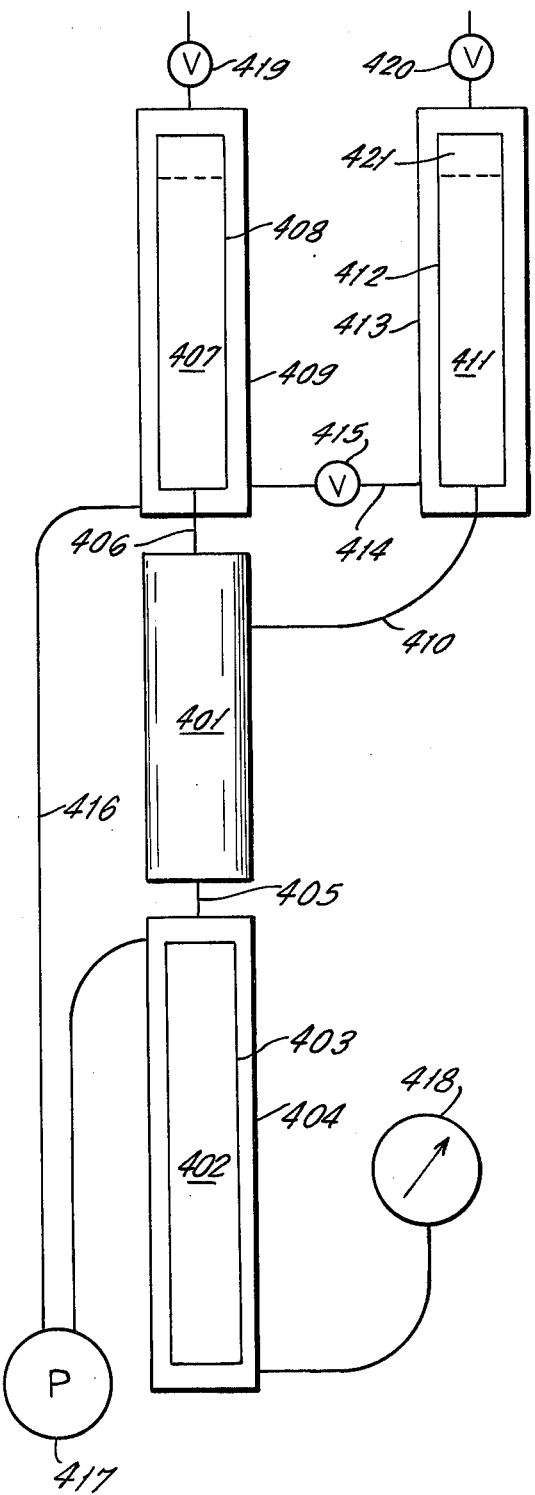

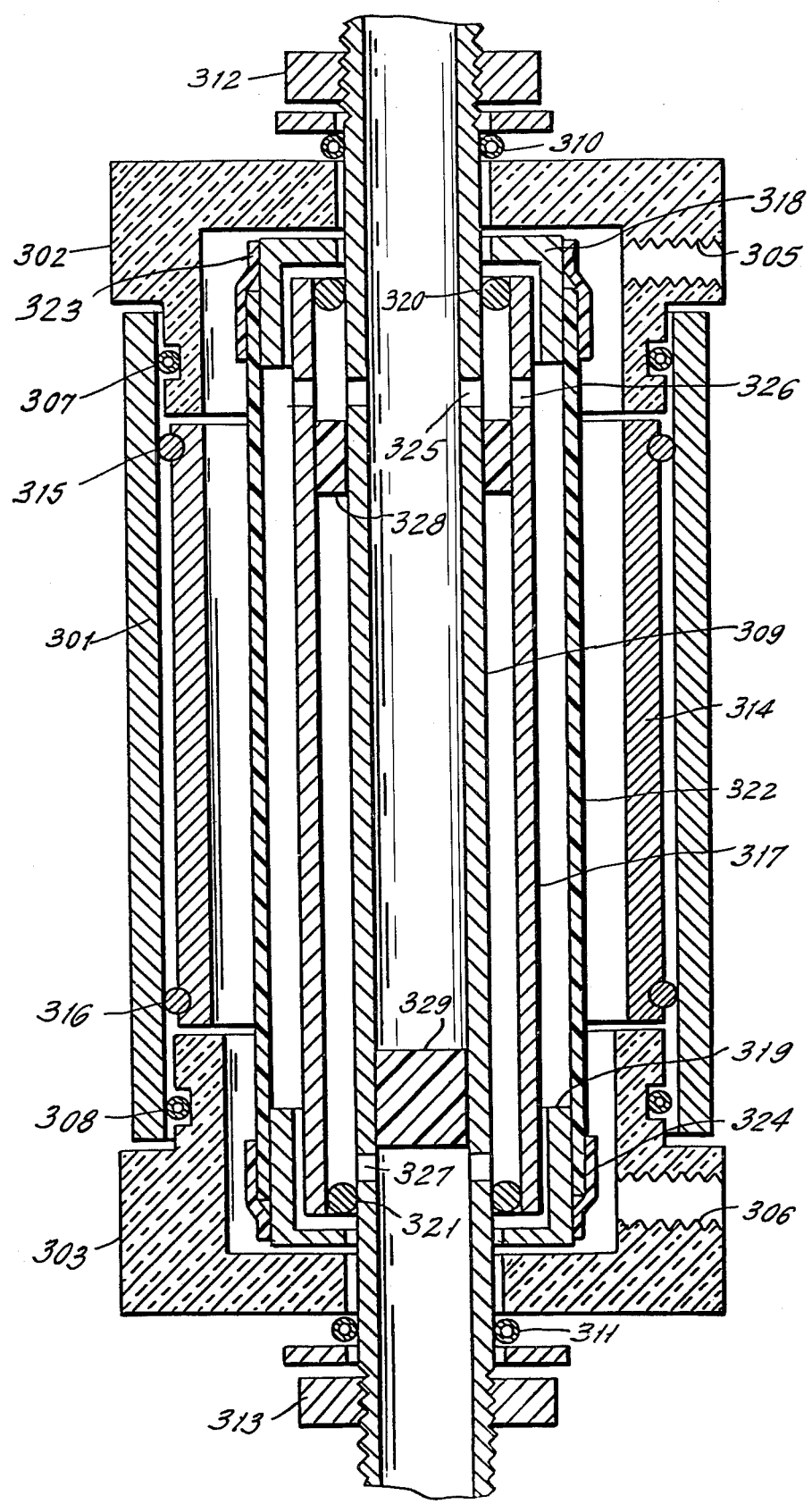

GAS PHASE FREE LIQUID CHLORINE ELECTROCHEMICAL SYSTEMS

BACKGROUND OF THE INVENTION:

In all of the known practical electrochemical systems involving chlorine, the chlorine is converted into gas somewhere in the system. This is true for both the reversible electrochemical systems such as the zinc/chlorine battery, and for non-reversible systems such as the sodium chloride chlorine-manufacturing cell.

In the zinc/chlorine battery described, e.g., in U.S. Pat. No. 3,713,888, as the battery is charged, the chlorine emerges from the cell as chlorine gas which is then dissolved in water or electrolyte and the latter is then cooled to form chlorine hydrate, in which form the chlorine is stored until the battery is discharged. When the battery is discharged, the chlorine hydrate is decomposed into chlorine gas and water, and the chlorine gas is then dissolved in the cell electrolyte in order to sustain the discharge.

In the sodium chloride chlorine-manufacturing process, chlorine gas formed is transferred out of the cell, dried and mechanically compressed and cooled into liquid form for storage and disposal.

The transition of the chlorine through the gas phase into another form in the reversing and non-reversing electrochemical systems consumes energy in an amount depending on the process steps involved in the transformation. In the zinc/chlorine-hydrate battery system, the hydrate formation requires removal of 18 kilocalories of heat per mole of chlorine stored and to remove this heat by refrigeration requires upwards of 6 kilocalories of mechanical work per mole of chlorine stored. The heat needed to decompose the chlorine hydrate for discharge of the battery can be supplied from the cell heat but some mechanical work is needed in order to transfer the heat to the hydrate, and dissolving the chlorine into the cell electrolyte also entails mechanical work because of the high dissolving rates required for adequate discharge. A total expenditure of upwards of 10 kilocalories of mechanical work per mole of chlorine stored is necessitated by the gas phase transition. In the sodium chloride chlorine-manufacturing process, the drying, compression and cooling of the chlorine gas to form liquid chlorine consumes upwards of 4 kilocalories of mechanical work per mole of chlorine liquified.

The energy consumed by the chlorine gas phase transition is particularly burdensome in the case of a reversible energy storage system because the transition energy is a direct inefficiency of the system. In the zinc/chlorine-chlorine hydrate system, the total mechanical energy expended because of the transition (for charge and discharge) amounts to at least 10% of the total energy stored. In other reversible systems, which are less energetic than zinc/chlorine, the transition for hydrate storage is even more onerous. For example, in a hydrogen/-chlorine-hydrate system, the gas phase transition amounts to at least 15% of the energy stored.

In addition to the energy consumption, the electrochemical systems involving chlorine require a large amount of auxiliary equipment. For example, a typical chlorine hydrate system can include four pumps, two gas dissolvers, two heat exchangers, and a refrigeration system as auxiliary components, amounting to about 30% of the total system cost. In a typical sodium chloride chlorine manufacturing process, two pumps, two heat exchangers, and one compressor are used as auxiliary components and typically account for about 25% of large system cost.

It has now been discovered that the gas phase transition can be entirely avoided in both reversing and non-reversing electrochemical systems involving chlorine and that the energy consumption required by such transition can also be avoided. Further, with respect to reversing electrochemical energy storage systems involving chlorine, it has been found that additional energy savings result indirectly from avoiding the gas phase for reasons which will be explained below.

Liquifying the chlorine as it is being generated by employing a much higher than normal pressure under the operating conditions has been disclosed heretofore. For example, Marconi Pat. No. 1,377,722 and Pieper Pat. No. 456,843 achieve the necessary pressure either by forcing a compressed gas into the electrochemical cell or by allowing the off gases of the electroytic reaction to accumulate in a gas space within the cell until the necessary pressure is achieved.

Accordingly, it is the object of this invention to provide a gas phase free, liquid chlorine electrochemical system and apparatus therefore in which considerable savings in energy consumption, equipment cost, and avoidance of cumbersome auxiliary equipment can be substantially realized. This and other objects of this invention will become apparent to those skilled in the art from the following detailed description in which:

FIG. 2 is a flow diagram of a preferred embodiment of the invention;

FIG. 3 is a cross sectional view of an electrode assembly which can be employed in this invention; and FIG. 4 is a flow diagram of another preferred embodiment of the invention.

SUMMARY OF THE INVENTION

Figure 1:
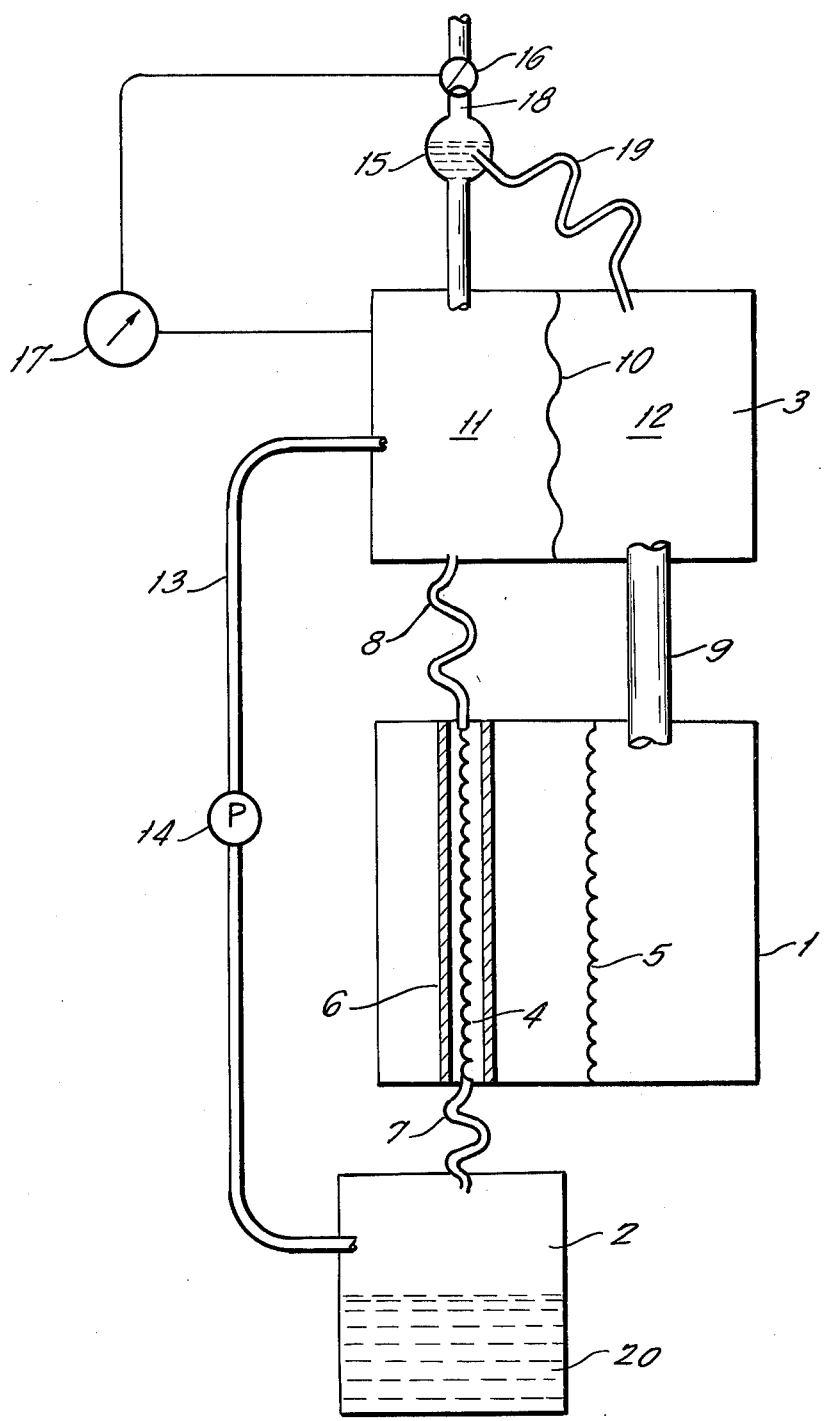
FIG. 1 is a flow diagram of one embodiment of this invention.

This invention relates to an electrochemical system involving chlorine, and more particularly to an electrochemical system and apparatus therefore in which chlorine generated at one of the electrode is liquified without substantially passing through the gas phase by compressing the liquid electrolyte to a pressure sufficient to liquify the chlorine as it is generated.

DESCRIPTION OF THE PREFERRED EMBODIMENTS

In general, the method by which the gas phase transition is avoided is by operating the electrochemical cell in a closed condition, substantially without space for gas, so that the self generated pressure conditions within the cell produces liquid chlorine directly within the electrolyte. In a non-reversing system such as a sodium chloride cell, the liquid chlorine as formed is withdrawn from the cell for use elsewhere. In a reversing system such as zinc/chlorine, the liquid chlorine is allowed to accumulate within the system during charge and to deplete during discharge. For convenience, the invention will primarily be described with reference to the zinc/chlorine-hydrate system of U.S. Pat. No. 3,713,888.

Turning now to FIG. 1, there is provided the electrochemical cell 1, a lower reservoir 2 and an upper reservoir 3. Cell 1 contains an electrode for the chlorine 4 and an electrode for the other product of the cell 5, e.g., zinc. Although two electrodes are diagramatically shown in FIG. 1, it will be understood that the cell can contain a plurality of electrodes. As a practical matter, the products of the electrochemical reaction other than chlorine (deosited zinc in the case of a zinc/chlorine battery and liberated oxygen and soidum hydroxide in the case of a sodium/chlorine battery) must be isolated from the chlorine and from electrolyte containing a high concentration of dissolved chlorine. This is accomplished by providing a separator 6 between the chlorine electrode and the other electrode. Separator 6 must be charcterized by being substantially impermeable to disolved chlorine yet offer small impediment to ionic transfer and by resisting the separate and combined corrosive effects of liquid chlorine, dissolved chlorine, the other electrolytic products and the electrolyte. It has been found that the cation permselective membranes produced in accordance with the U.S. Pat. No. 3,282,875 satisfy each of these requirements for a variety of systems including zinc/chlorine, hydrogen/chlorine, and sodium/chlorine. Reservoir 2 is connected to the space within separator 6 by a conduit 7 and the space within separator 6 is connected to reservoir 3 by a conduit 8. The space of cell 1 containing electrode 5 is connected to reservoir 3 through a conduit 9.

Chlorine leakage out of the chlorine compartment i.e., the space enclosed by separator 6, through small holes in joints and the like reduces efficiency. Chlorine leakage from the chlorine compartment into the other compartment can be greatly reduced if the hydraulic pressures in the two compartments are matched in places where leakage can occur. For example, when electrolyte circulates through both compartments, the circulation flows can be matched closely enough such that the pressure differentials where leakage can occur is very small. When circulation is effected only in the chlorine compartment, as for example, in high current density operation of the zinc/chlorine gas phase liquid free chlorine system, pressure balancing can be achieved by operating with positively no gas (and therefore, no compressibility) in the zinc compartment; the average hydrostatic pressure is equalized between the chlorine compartment and the zinc compartment by movement in surfaces that separate the two compartments, e.g., separator 6. This can further be accomplished by providing a flexible diaphragm 10 in reservoir 3 which divides reservoir 3 into two compartments 11 and 12.

If the liquid chlorine which is formed during the process of this invention accumulates within electrode structure, the electrolytic action will be adversely affected. Therefore, electrolyte circulation in the chlorine containing compartment is effected. In FIG. 1, this is accomplished by connecting reservoir 3 with reservoir 2 by a conduit 13 which contains a pump 14. The circulation of the electrolyte need be no more than that necessary to promote separation as a result of the density difference between the electrolyte and the liquid chlorine. However, in a reversing system, circulation of the electrolyte is needed during both charging and discharging. A considerable advantage of the gas phase free liquid chlorine reversible systems is the combination of high concentrations of dissolved chlorine as the result of elevated pressure and the affinity that liquid chlorine has for mixing with and feeding chlorine to the electrolyte, due, in part, to the close balance between the positive heat of solution of chlorine in the electrolyte and the negative heat of the formation of liquid chlorine. The combination of high chlorine levels and ease of chlorine solution means that the circulation requirements for discharge are as modest as those for charge, with consequent energy saving.

The overall energy efficiency of a reversible system depends upon efficiency during charge, efficiency during stand (involving self-discharging and idle condition), and efficiency during discharge. Each of these efficiencies depend, in part, upon how much chlorine escapes the chlorine compartment to react chemically with the other electrochemical products (deposited zinc, for example). However, stand efficiency also depends upon how much chlorine reaches the chlorine electrodes during stand to thereby feed a self-discharge through leakage.

The main leakage is typically through the separator 6 and is roughly proportional in amount to the difference between the chlorine concentration on the two sides of separator 6. However, when the electrolyte in the non-chlorine compartment is stagnant, chlorine diffusion is normally slow. It will be appreciated that in the zinc/chlorine system, where pressure balancing is achieved by operation of the zinc compartment without a gas phase and without forced circulation, there is minimum leakage through separator 6.

Of course, electrolyte stagnation in the non-chlorine compartment is disturbed by charging and discharging effects. The greater the current density, the greater the disturbance but even at high charge current densities (40 ma/cm$^2$ in the zinc/chlorine system), the disturbance is much less than even very modest forced electrolyte circulation through the non-chlorine compartment.

The major factors involved in the self discharge due to chlorine contact with the chlorine electrode are the volume of the chlorine electrode compartment and the transfer of chlorine into this compartment from chlorine storage under stagnant conditions. Therefore, having as little free space as possible within and around the chlorine electrode and having as small a diffusion rate through the electrolyte channels between the chlorine electrode compartment and the chlorine storage will contribute to stand efficiency. Fortunately, liquid chlorine does not have much tenacity for the commonly used chlorine electrode materials (graphite and ruthenized titanium) or for commonly used separator material. Accordingly, minimum electrolyte circulation action is needed to keep the free space around the chlorine electrode clear of liquid chlorine. Additionally, the electrolyte used in a reversible cell has a high chlorine concentration, and, therefore, the circulation requirement for discharge is modest, permitting a very small gap between the chlorine electrode face and separator 6.

Diffusion of chlorine from chlorine storage into the chlorine electrode compartment is largely governed by the size of the electrolyte channel connecting the two compartments. The smaller the channel cross section and the greater the length, the smaller is the diffusion rate. The low circulation requirement of the instant system is an advantage because the limitation on reducing the cross section and increasing the length of the connection channel is the impedance offered thereby to electrolyte circulation. A valve can always be provided in the connection channel but this expedient is preferred for long term stand situations (weeks) and, depending on system size, may not be justified to cope with short stands (hours).

A minimum cross section and maximum length of connection channels is also important in order to minimize electrical leakage. Any such leakage through the channel connecting the chlorine electrode compartment to the chlorine storage compartment leads to inefficiency during charge and discharge, as well as during stand, and is a particular consideration where a single chlorine storage compartment is common to a plurality of chlorine electrode compartments, each at a different voltage level. The latter situation is common, e.g., in small systems, such as in mobile batteries. It will therefore be recognized that the instant gas phase free liquid chlorine system has particular advantages in mobile applications partly due to the high chlorine concentrations and the consequent small connecting channel size.

In general, it is preferred that the ratio of the length of the connection channel to the cross section thereof be at least about 10:1 and preferably at least about 100:1

Chlorine stored within the chlorine electrode 4 itself can be a major contributor to stand efficiency, and especially with electrode materials such as highly porous graphite or titanium. Such highly porous electrode materials are commonly used in gas phase systems in the "flow through mode" (i.e., electrolyte is circulated out through the active face of the electrode in order to make more efficient use of low levels of dissolved chlorine in the electrolyte. In the present system, highly porous electrode materials used in the "flow through mode" are not essential to adequate discharge because of the high dissolved chlorine level. Therefore, with a view to improving stand efficiency without penalizing discharge performance, less bulky, less porous chlorine electrodes than are commonly used in gas phase chlorine systems are preferred in the instant system.

Most electrochemical systems involving chlorine continuously produce some foreign gas, mainly at the chlorine electrode, which builds up pressure in a closed system. Some system pressure over and above the natural liquid chlorine pressure may be desirable, e.g., to promote chlorine liquification at the chlorine electrode face which may be at a higher temperature than the rest of the system, but some venting or neutralizing of the foreign gas is a practical necessity. The optimum size for the gas space in any particular gas phase free liquid chlorine system depends, partly, on how fast pressure producing foreign gas is evolved in the system. From the very important point of view of minimizing explosion hazard due to explosive gas mixtures in the gas phase, the smaller the gas space, the better. It is therefore preferred to employ a relatively small gas space coupled with foreign gas venting or a neutralizing device activated by a moderate pressure rise. For example, in a zinc/chlorine reversible liquid chlorine system using graphite electrodes, oxygen produced at the chlorine electrode is the primary pressure producing foreign gas. However, because of the high chlorine concentration at chlorine electrode 4, the oxygen is produced in a small enough quantity such that a gas phase volume equal to 1% of the total system volume requires venting only once per charge-discharge cycle in response to an about 2.1 kg/cm$^2$ pressure rise.

In the embodiment of FIG. 1, a provision for gas is located at the uppermost part of reservoir 3 as a bulbous tubular projecting 15 out of the top of compartment 11. A venting valve 16 is provided at the top of projection 15 and a pressure gauge 17 is connected into valve 16 and compartment 11 so as to open and close valve 16 at a preset pressure. A small gas space 18 is provided in projection 15. In general, gas space 18 will occupy less than about 5% of the total system volume. No gas space is provided in the compartment containing the other electrode 5 or in the electrolyte storage compartment 12 of reservoir 3. Instead, a capillary connection 19 is provided connecting compartment 12 with projection 15 below the liquid level in projection 15. Diffusion of chlorine through venting capillary 19 is small enough to have negligible effect on efficiency.

To operate the embodiment of FIG. 1, cell 1, reservoirs 2 and 3 and all interconnections and projections are completely filled with, e.g., a 40% aqueous zinc chloride electrolyte and all gas vented. Additional electrolyte is then pumped into the system to raise the pressure to about 6.3 kg/cm$^2$, as indicated by gauge 17. Circulation pump 14 is adjusted to the flow rate appropriate for charge and the charge current flow is started between electrodes 4 and 5. Chlorine initially generated at electrode 4 goes directly into solution in the electrolyte. The system pressure steadily rises due to foreign gas generation at chlorine electrode 4 and the foreign gas accumulates in gas space 18, making space for itself by compressing the electrolyte slightly. Typically, by the time the electrolyte is saturated with chlorine, the system pressure has risen to about 8 kg/cm$^2$. After electrolyte saturation, the chlorine liquifies as it is generated, assuming that the system temperature is about 30° C, which is above the chlorine hydrate formation temperature. The circulation of pump 14 prompts the liquid chlorine 20 to settle at the bottom of reservoir 2. The system pressure will rise due to continued generation of foreign gas and when the pressure reaches about 10.1 kg/cm$^2$, valve 16 is opened to vent gas out of gas space 18 and reduce system pressure to about 8 kg/cm$^2$. Valve 16 can connect gas space 18 with another gas space which contains, e.g., a 20% hydrogen, 80% nitrogen mixture at about 8 kg/cm$^2$ and a device for catalyzing a reaction between chlorine and hydrogen and oxygen and hydrogen.

When charging is completed, electrodes 4 and 5 are disconnected from the power source, pump 14 is deactivated, and the system stands idle awaiting discharge. Chlorine within separator 6 at the end of charging is relatively quickly dissipated, partly by movement through separator 6 into the other compartment, and mainly by conversion to chloride at electrode 4. The loss of chlorine is small because of the relatively small volume of free space inside separator 6 and within electrode 4 which is, e.g., a titanium wire-spiral coated with ruthenized oxide. Replenishment of the chlorine inside separator 6 by diffusion through conduits 7 and 8 is relatively slow because of the maximum length and minimum cross-section thereof. Therefore, the self discharge of this embodiment is small.

In order to discharge, pump 14 is adjusted to the appropriate discharge rate and electrodes 4 and 5 are connected to the load. In this zinc/chlorine example, zinc is depleted at electrode 5 and chlorine is depleted at electrode 4. The voltage loss at chlorine electrode 4 depends partly on how efficiently dissolved chlorine is brought into contact with the electrode surface. Therefore, one purpose of pump 14 is to maintain sufficient electrolyte turbulence to insure a consistently high chlorine level at the surface of electrode 4. The preferred device is for maintaining such turbulence is illustrated by the embodiment shown in FIG. 2.

The embodiment of FIG. 2 has particular utility in a reversible system where there is alternating circulation, i.e., where the direction of circulation flow is reversed. This embodiment provides a means of increasing the safety, reliability, and efficiency of the system while at the same time, reducing the need for high cost construction materials. The cell 1, lower reservoir 2, and upper reservoir 3 of FIG. 1 are shown in FIG. 2 as numbers 201, 202, and 203, respectively. In this embodiment, alternation of the circulation is accomplished by alternately increasing and decreasing the pressure outside the two electrolyte reservoirs 202 and 203 so that the pressure outside one reservoir is low while the pressure outside the other reservoir is high. The alternating pressure drives electrolyte backwards and forwards from one reservoir to the other and hence backwards and forewards through the chlorine compartment of cell 201. The reservoirs 202 and 203 are made of flexible material and pressure is transferred to the flexible reservoirs by water 204 contained between the reservoirs and substantially inflexible containers 205 and 206 which envelop reservoirs 202 and 203 respectively. The volume of water 204 is relatively small and only a small fraction of this volume is pumped between reservoirs 202 and 203 through a conduit 207 containing a conventional water pump 208.

The pressure differential between the inside and outside of flexible reservoirs 202 and 203 is merely a few g/cm$^2$ generated by water pump 208 and, therefore, relatively weak materials are adequate for construction of reservoirs 202 and 203. For example, teflon coated fiberglass cloth, which can withstand all liquid chlorine cell corrosive actions even at elevated temperature, is suitable. Outer containers 205 and 206 must be suitable for the full system pressure, which can be as high as about 150 psig, but are separated from the corrosive elements within reservoirs 202 and 203 by the water 204 and the flexible material. Therefore, containers 205 and 206 are chosen of a material based on low cost and high strength and can be, for example, steel. Water 204 is continually monitored to determine whether there is a chlorine or other chemical levels sufficient to cause a corrosive condition dangerous to the container material. A small amount of leakage requires only periodic replacement of water 204. It is preferred to alternate circulation of water 204 by operating pump 208 sinusoidally.

In a typical zinc/chlorine system, for example, the optimum electrolyte amount transferred each cycle during charge is about ten times the chlorine electrode compartment volume, which is typically about 1% of the chlorine reservoir volume. Generally, the cycle rate during charge is 3 cycles per minute. In most systems, the liquid chlorine 209 is denser than electrolyte 210 and settles to the bottom, and is stored in, the lower part of reservoir 202.

An important advantage of the embodiment shown in FIG. 2 is there is limited heat transfer from cell 201 into reservoirs 202 and 203 which allows optimizing efficient chlorine transfer to and from the chlorine electrode during charge and discharge independently of heat transfer requirements, and thereby leading to a more energy efficient system. Another important advantage is that the turbulence desired is very well promoted and maintained by the alternating circulation. The turbulence coupled with high chlorine levels intrinsic to the gas phase free liquid chlorine system combine to yield high voltage efficiency despite high current densities and despite the use of non-flow through-non-porous electrodes.

FIG. 3 shows a battery cell which can be used in the invention. The battery cell has an outer shell 301 constructed of a suitable conducting material such as titanium. Shell 301 is provided with an upper endcap 302 and a lower endcap 303 made of suitable insulating materials. Upper endcap 302 is provided with a tube connection port 305 and lower endcap 303 is provided with a tube connection port 306. For sealing purposes, teflon O-rings 307 and 308 are compressed between endcaps 302 and 303, respectively, and shell 301. A flow channel 309 passes through endcaps 302 and 303 and is located centrally of shell 301 and coaxial therewith. Channel 309 is constructed of a suitable conducting material such as titanium, and is secured in position within openings in caps 302 and 303. Channel 309 is sealed relative to caps 302 and 303 by means of O-rings 310 and 311 which are compressed against the outer surface of endcaps 302 and 303 by nuts 312 and 313. An electrode 314 of suitable material such as graphite is tightly fitted inside shell 301 and makes electrical contact with shell 301 by means of wire rings 315, 316 which are positioned between electrode 314 and shell 301. A second electrode 317 is positioned between tubular channel 309 and electrode 314 and held in position by means of caps 318, 319, at its ends. Electrical contact between electrode 317 and the central channel member is effected by wire rings 320 and 321.

A separator 322 is positioned between electrodes 314 and 317. Separator 322 can, for example, be made of Nafion, a perflorosulfonic acid based permselective plastic material, about 10 mils thick, which is formed into a cylinder. The ends of separator 322 are held against the outer surface of cap 318, 319 by means of teflon tape 322, 324. Toward the upper end of channel 309, a set of holes 325 is provided. A similar set of holes 326 is provided near the upper end of electrode 317 near holes 325. At the bottom of tubuler member 309, another set of holes 327 are provided. In order to maintain the spacial relationship between electrode 317 and tubular member 309, a tubular blocking piece 328 is provided therebetween slightly below holes 325 and 326. A blocking piece 329 is also provided in tubular channel 326 slightly above holes 327.

The cell of FIG. 3 operates in the following fashion. Electrode 314 is the chlorine electrode and the chlorine electrode electrolyte enters the cell through port 306, flows up through the cell between electrode 314 and separator 322, and then exits through port 305. Electrode 317 is the zinc electrode and the zinc electrode electrolyte enters the bottom of member 309 and is prevented from traveling completely through member 309 by blocking piece 329. The electrolyte flows through holes 327 and is prevented from flowing between electrode 317 and member 309 to holes 325 by blocking piece 328. Therefore, the electrolyte flows through porous electrode 317 and any zinc deposited thereon, through the space between electrode 317 and separator 322, through holes 326 and 325 and then exits the cell through the upper part of member 309. Electrical connection to chlorine electrode 314 is made by clamping suitable wires onto shell 301 and electrical connection to the zinc electrode 317 is made by clamping suitable contact wires onto either the upper or lower parts of member 309.

FIG. 4 shows a preferred embodiment of the instant invention. In FIG. 4, the cell 301 of FIG. 3 is shown as 401. The system contains a lower reservoir 402 which is composed of a flexible liner 403 surrounded by a rigid container 404 and contains water between liner 403 and container 404. Lower reservoir 402 is connected to cell 401 through a conduit 405. A conduit 406 leads from the chlorine compartment of cell 401 to an upper reservoir 407 which is comprised of a flexible liner 408 surrounded by a rigid container 409 with water therebetween in the same manner as reservoir 402. A second conduit 410 connects the zinc compartment of cell 401 to a second upper reservoir 411 which is also composed of a flexible liner 412 surrounded by a rigid container 413 with water therebetween. The water space in reservoir 411 is connected to the water space in reservoir 407 by a conduit 414 which contains a valve 415 therein. The water space in reservoir 407 is connected to the water space in reservoir 402 by a conduit 416 which contains a water pump 417 therein. The water space in reservoir 402 is also connected to a suitable pressure gauge 418. Suitable venting valves 419 and 420 are connected to the upper portions of inner liners 408 and 412 of reservoirs 407 and 411, respectively.

Outer containers 404, 409 and 413 can be made of, for example, Lexan, a transparent, high strength, shock proof material. Although Lexan is not resistant to chlorinated electrolyte, it is exposed only to very low concentrations such as may leak out of liners 403, 408 and 412. The liners 403, 408 and 412 can be made of, for example, fluorinated ethylene polymer material, termed FEP in the trade, which is a flexible, translucent material of moderate strength, completely resistant to chlorinated electrolyte and liquid chlorine. Conduits 405, 406, 414 and 416 can also be FEP tubing, although conduits 414 and 416, being exposed only to water, can also be manufactured of a large number of materials such as, for example, polyvinylchloride. Pump 417 can be a small conventional pump capable of pumping water up to a pressure of about 5 psi in either direction and pressure gage 418 can be a conventional 150 psi water gage.

The only operational difference between the embodiment of FIG. 4 and that illustrated in FIG. 1 is in the circulation system. The embodiment of FIG. 4 has an alternating circulation of the type illustrated in FIG. 2. The embodiment of FIG. 4 also has a separate zinc reservoir 411 and a separate gas space 421 with a venting valve 420 for the zinc compartment. Zinc reservoir 411 is merely an extension of the zinc electrode compartment of cell 401 which has been added to allow observation of foreign gas evolution in the zinc compartment and so as to furnish additional electrolyte volume. Gas space 421 is filled with electrolyte when the system is initially filled and remains filled with electrolyte through charge and discharge cycles and may show some small amount of gas after standing overnight. Valve 415 in conduit 414 is employed merely to equalize water pressure when the reservoirs are filled with water but is otherwise normally closed so that liner 412 is not subject to alternating water pressure and there is, accordingly, no forced circulation of the electrolyte in the zinc compartment of cell 401.

The embodiment shown in FIG. 4 is typically operated at a temperature of about 30° C. The pressure is about 6.6 to 10.1 kg/cm$^2$ during charging, about 8 to 6.6 kg/cm$^2$ during discharging and the system can be vented at about 10.1 kg/cm$^2$. The current density during charge and discharge is typically 50 ma/cm$^2$. Generally, charging requires about 8 hours during which time the water pressure fluctuation is about 0.4 kg/cm$^2$ and the alternating frequency is about 3 cycles per minute.

A typical discharge time is 6 hours during which the water pressure fluctuation is about 0.4 kg/cm$^2$ and the alternating water frequency is about 6 cycles per minute.

With respect to overall system cost, the instant invention in reversible systems provides a further important advantage. High current density operation is more easily accomplished in gas phase free systems than in gas phase systems, particularly in those systems where there are no solid components to restrict the charge rate such as the hydrogen/chlorine reversible system. Operating a cell at high current densities reduces the electrode area required roughly in proportion to the current density. For example, a cell operating at 500 ma/cm$^2$ requires 1/10th of the electrode area of a cell operating at 50 ma/cm$^2$ and therefore, will cost about 1/10th as much. Since cell cost in a typical large reversible energy storage system is generally somewhat better than 1/3 the total cost, the economy of operating at high current density is readily apparent.

Various changes and modifications can be made in the process and apparatus of this invention without departing from the spirit and scope thereof. The various embodiments set forth herein were for the purpose of further illustrating the invention but were not intended to limit it.

I claim:

1. In the method of operating an electrochemical cell comprising a housing containing at least two electrodes by imposing an electric current across the electrodes and wherein chlorine is generated at at least one electrode, the improvement which comprises filling the housing with sufficient electrolyte such that the autogenous pressure is at least equal to that sufficient to liquify the chlorine as it is generated, and such that there is no space available for gas accumulation, before imposing said current, and causing said electrolyte to move thereby preventing liquid chlorine accumulation at the electrodes.

2. The method of claim 1 wherein the electrode at which chlorine is generated is surrounded by a cation permselective membrane so as to define a chlorine electrode compartment and said compartment is separately connected to two electrolyte reservoirs and wherein electrolyte is caused to move between said two reservoirs and through said chlorine electrode compartment.

3. The method of claim 2 wherein said electrolyte is caused to move between the two reservoirs by adjusting the pressure imposed on one reservoir relative to the other reservoir.

4. The method of claim 3 wherein pressure is adjusted by changing the pressure of a hydraulic fluid surrounding each of said reservoirs.

5. The method of claim 2 wherein the gases generated other than chlorine are accumulated in one of said reservoirs and vented when the pressure exceeds a predetermined value.

6. An electrochemical cell comprising a housing, at least two electrodes within said housing, a cation permselective membrane separating one of said electrodes so as to define a chlorine electrode compartment containing said separated electrode, a first electrolyte reservoir having flexible walls connected to said chlorine electrode compartment by a first conduit, a second electrolyte reservoir having flexible walls connected to said chlorine electrode compartment at a point spaced apart from said first conduit by a second conduit, and means to cause electrolyte to move between said first and second reservoirs and through said chlorine electrode compartment comprising means to vary the pressure on the outside of the flexible walls of said first reservoir relative to the pressure on the outside of the flexible walls of said second reservoir.

7. The electrochemical cell of claim 6 wherein said flexible walls of said first reservoir are surrounded by a casing, a first hydraulic fluid between said first casing and the flexible walls of said first reservoir, a second casing surrounding the flexible walls of said second reservoir, a second hydraulic fluid between said second casing and said flexible walls of said second reservoir, and wherein said means to vary the pressure on the outside of the flexible walls comprises means to vary the pressure of said first and second hydraulic fluids relative to one another.

8. The electrochemical cell of claim 7 wherein said first reservoir contains means to vent gas other than chlorine gas when the pressure exceeds a predetermined value.

9. The electrochemical cell of claim 6 wherein said first reservoir contains means to vent gas other than chlorine gas when the pressure exceeds a predetermined value.

* * * * *